(12) United States Patent  
Remy

(10) Patent No.: US 7,384,088 B2  
(45) Date of Patent: Jun. 10, 2008

(54) SLIDING SUN VISOR

(75) Inventor: Dominique Remy, Rupt sur Moselle (FR)

(73) Assignee: Grupo Antolin-Ingenieria, S.A., Burgos (ES)

( * ) Notice: Subject to any disclaimer, the term of this patent is extended or adjusted under 35 U.S.C. 154(b) by 7 days.

(21) Appl. No.: 11/261,501

(22) Filed: Oct. 31, 2005

(65) Prior Publication Data

US 2006/0113819 A1    Jun. 1, 2006

(30) Foreign Application Priority Data

Nov. 30, 2004  (EP)  .................................. 04078253

(51) Int. Cl.  
*B60J 3/00* (2006.01)

(52) U.S. Cl. .................... 296/97.11; 296/97.5

(58) Field of Classification Search ............. 296/97.11, 296/97.5, 97.8  
See application file for complete search history.

(56) References Cited

U.S. PATENT DOCUMENTS

| | | | |
|---|---|---|---|
| 5,653,490 A | 8/1997 | Fink et al. | |
| 6,131,985 A | 10/2000 | Twietmeyer et al. | |
| 6,139,083 A | 10/2000 | Fischer et al. | |

FOREIGN PATENT DOCUMENTS

| | | |
|---|---|---|
| DE | 100 17 047 A1 | 10/2001 |
| JP | 2002-211315 | 7/2002 |

*Primary Examiner*—Joseph D. Pape  
(74) *Attorney, Agent, or Firm*—Birch, Stewart, Kolasch & Birch, LLP

(57) ABSTRACT

A sliding sun visor having: a pivot rod (2); a conductor (3) for supplying power to at least one electrical device included in the sun visor structure (1). The conductor (3) has a second portion having at least a length to enable the sun visor structure (1) be positioned in the most extended use-position. The sun visor structure (1) has conductor housing elements (4) for housing the second portion of the conductor. The conductor housing elements (4) are parallel to the pivot rod (2). The conductor housing elements (4) are provided with a longitudinal groove (40), the conductor (3) has continuous conductor cables from the first end to the at least one electrical device and the conductor (3) is transversally folded.

10 Claims, 7 Drawing Sheets

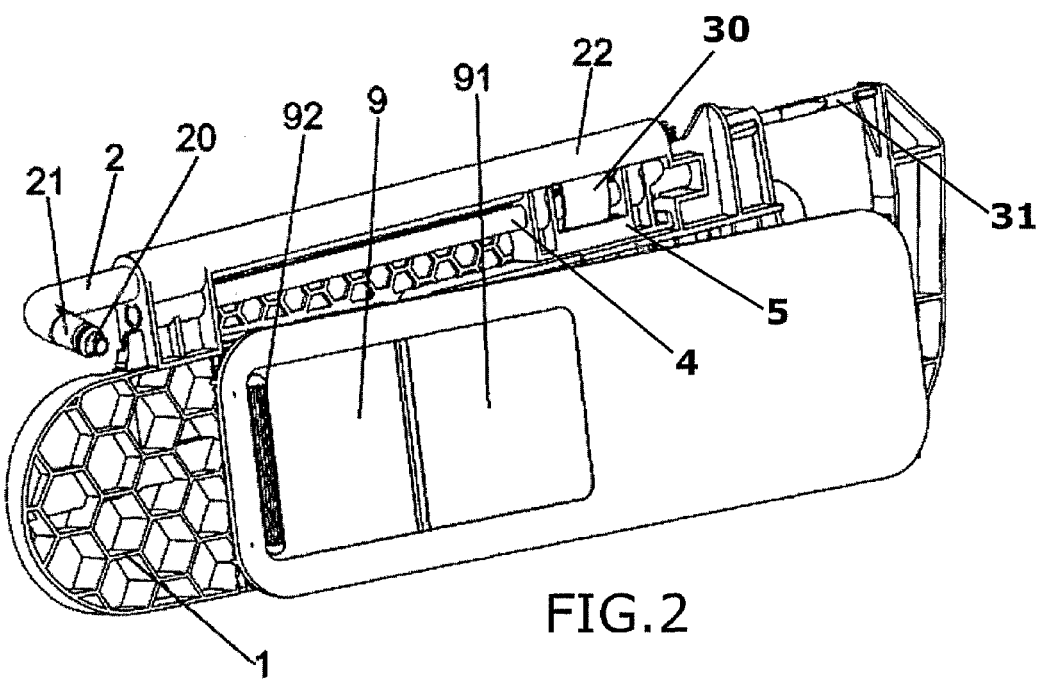
FIG.2
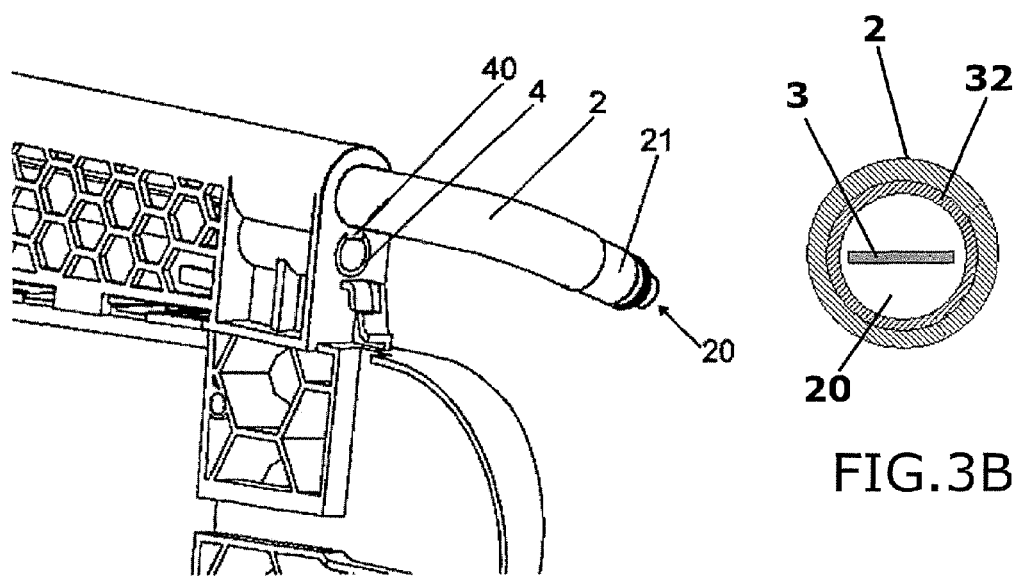
FIG.3A
FIG.3B

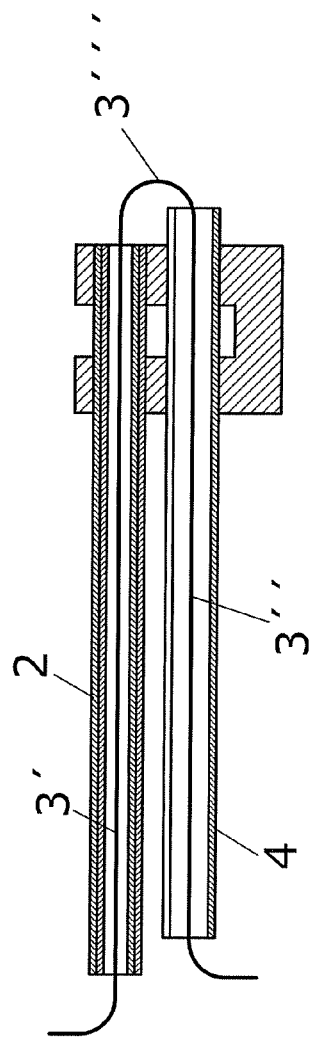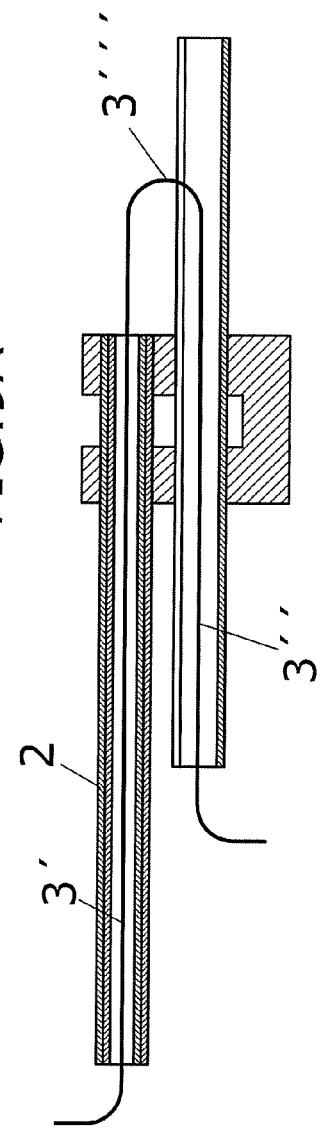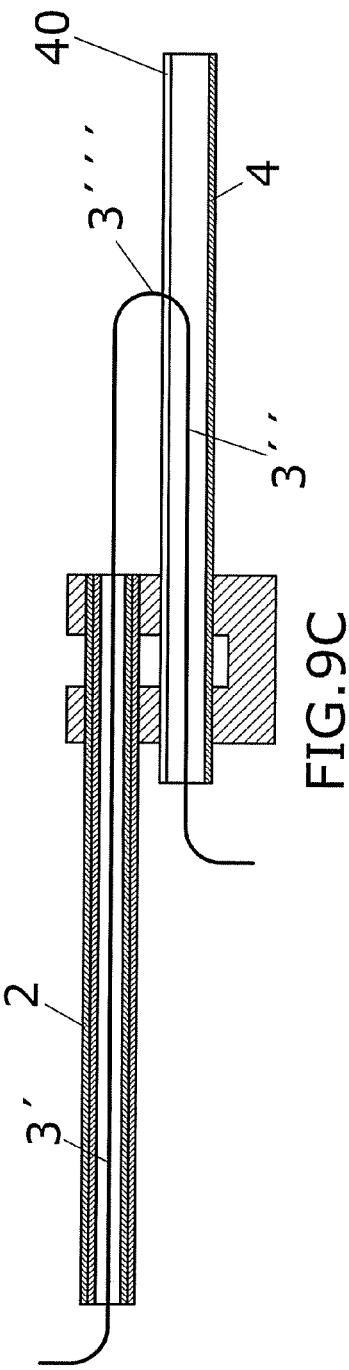

SLIDING SUN VISOR

FIELD OF THE INVENTION

The invention forms part of sliding sun visor with electrical fittings for motor vehicles.

BACKGROUND OF THE INVENTION

Sun visor for motor vehicles are elements assembled into a vehicle interior at the headliner area. The purpose of sun visors is to protect occupants from possible dazzling because of sunlight.

Usually, sun visors have two functions to which two movements correspond:

frontal protection: the sun visor is folded around a pivot rod to be placed into a lowered use position.

Lateral protection: the sun visor is rotated around a vertical minor axle at one end of the sun visor to cover the side window area.

Sun visor known in the art show protection limited to the maximum area of the sun visor itself, which does not correspond to the possible total protection area. However, dimensions of the adjacent elements to the sun visor make difficult to design sun visors which do not interfere with the elements surrounding the sun visor.

In order to extend the protection of sun visors beyond the area of its body which is that gives protection in a maximum area, sliding sun visors have been developed so that they can be placed at positions which allow protection in additional zones to these corresponding to the body.

An added problem to the extension of sun visors takes place when a vanity mirror with lightning is included in the sun visor. Sun visor known in the prior art are disclosed in the following patent documents:

U.S. Pat. No. 5,653,490: A visor includes a guide channel which receives an elongated pivot rod and combined torque control and slide. The slide comprises a lubricant polymeric member which surrounds the torque control to present a sliding interface between the visor rod and channel within the visor body while the torque control allows the visor to be raised to desired adjusted positions between a raised storage position adjacent the vehicle roof and lowered use positions.

U.S. Pat. No. 6,131,985: Each visor core component includes an alignment element which cooperates with an alignment on the outer covering thereby maintaining the visor core components in the proper location. The modularity of the visor core components allows for their use with any one of a plurality of differently configured outer coverings and in a plurality of different visor core component combinations. The modular components include a hinge block for rotatably engaging a visor support rod, a pin section having an exposed support member of supporting a free end of the visor blade and track components for slidingly engaging other components such as a sun visor extension panel.

U.S. Pat. No. 6,139,083: A vehicle sun visor assembly includes a shaft configured for mounting in a vehicle. The shaft includes in-molded first and second electrical wires extending longitudinally along the shaft. The first and second electrical wires include corresponding first and second exposed contact surfaces circumferentially spaced about the shaft. The sun visor body is pivotally and slidably mounted to the shaft and includes first and second mating contacts positioned for selective engagement with the first and second exposed contact surfaces only when the sun visor is positioned for a predetermined pivotal and longitudinal position with respect to the shaft for providing electrical power to a vanity mirror or the like.

DE10017047: The sunshade has a pivotable, movable sunshade body on an axle mounted to allow rotation but axially fixed to a slide body that is rotationally fixed boy axially movable in a hollow body with a spring loaded pressure element acting radially on the axle. The body has at least one electrical lighting switch, a remote control unit for a garage door opener and a cable with one or more conducting wires and an excess to allow for sunshade movement. The sunshade has a sunshade body pivotable about an axle and able to move along the axle, which is mounted to allow rotation but is axially fixed and is accommodated by a slide body that is rotationally fixed but axially movable in a tubular hollow body embedded near a longitudinal edge of the body and that carries a spring loaded pressure element acting radially against the axle, which has a flat. The body has at least one switch for switching an electrical lighting device on and off, a remote control unit for an automatic garage door opener and a cable containing one or more conducting wires with an excess provided to allow for sunshade movement.

JP2002211315: The sun visor for vehicles has a spindle internally mounted on a sun visor body which is rotatable around the spindle and slidable along the axial direction of the spindle. A light quantity regulating means for regulating light quantity of the luminaire mounted on a cabin side or on the sun visor body side is mounted between the sun visor body and the spindle. The light quantity regulating means regulates light quantity of the luminaire when said light quantity regulating means detect that the sun visor body has been rotated around the spindle by a predetermined angle or that the sun visor body has been slid along the spindle by a predetermined quantity.

The problem to be solved by the present invention is to provide a simplified sliding sun visor which includes continuous power supply.

DESCRIPTION OF THE INVENTION

The present invention provides a sun visor with additional protection beyond its home position, guaranteeing power supply in every position: not extended, partially extended, or totally extended.

The present invention comprises a plurality of features:

Slide with metal guide. Extension of the sun visor is carried out by sliding the pivot rod and slide or sliding guiding means, which are joint, in the racket or sun visor structure. The slide is guided by a metal tube or conductor housing means parallel to the pivot rod, said tube being used as a housing of electrical lead or conductor.

Flexible tape of power supply or flexible printed circuit (FPC), in other words, the conductor. Power supply all along the sun visor length form the entry of the pivot rod to the mirror is carried out by means of a flexible tape conductor such as a type if flexible printed circuit (FPC) or flexible flat cable (FFC). Said flexible tape is capable of changing its shape in each movement of extension or backward movement of the sun visor.

Micro-switches. Switch on and off of mirror lighting is activated by micro-switches placed near a pivot rod end (first micro-switch) and a mirror cover end (second micro-switch). The first micro-switch is related to the sun visor rotation and the second micro-switch is related to the mirror cover movement.

The new features of the invention provide a plurality of advantages over the prior art:

Power supply is guaranteed because the electrical conduction is not interrupted. The power supply from the power supply inlet at the adaptor located in the joint of the pivot rod end to the electrical fittings is not interrupted thanks to the flexible tape (FFC or FPC), which is a warranty of power supply at every condition.

Mirror lighting at any position of the sun visor. Previously mentioned power supply continuity allows lighting at any extended position of the sun visor, thus avoiding power interruption at intermediate positions, as it happens in the state of the art.

Moreover, the length of conductor element is kept constant. That is, flexible tape length is the same independent of sun visor position. When the sun visor is unextended, flexible tape follows a whole way from inlet to electrical fittings. When it is extended, flexible tape goes throughout the groove opening keeping length of flexible tape constant.

Possibility of including several electrical fittings. According to the previously mentioned features, it is possible to include other functions, requiring power supply on a permanent basis, as can be an antenna, a remote control unit like a domotic, "home-link" module, or the like.

The conductor is transversally folded.

i) when the sun visor is unextended, the flexible tape conductor is folded in an end of the metal tube.

ii) when the sun visor is extended, the flexible tape is unfolded in the end of the metal tube because the flexible tape passes through the tube opening.

Slide guiding. The tube or conductor housing means are a cover for the conductor or flexible tape (FFC or FPC) and a guide for the slide. Thus, the tube drives sliding movement when the slide goes forward and backward to provide precise positioning and solid feeling when extending the sun visor.

A first aspect of the invention relates to a sliding sun visor having:

A pivot rod having a first end arranged to be articulated to a headliner of a vehicle.

a second end opposite to the first end, and a hollow space extending from the first end to the second end;

a sun visor structure coupled to the pivot rod in a manner so as to enable the sun visor structure to be placed in a use-position by pivoting around said pivot rod from a raised storage position to a lowered use-position, wherein when the sun visor is in said lowered use-position the sun visor can slide along said pivot rod guaranteeing power supply when the sun visor is not extended, partially extended or totally extended;

a conductor for supplying power to at least one electrical device included in the sun visor structure, said conductor comprising:

a first portion defined between the first end of the pivot rod and the second end of the pivot rod, said first portion being housed in the hollow space of the pivot rod and a second portion having at least a length to enable the sun visor structure be positioned in the totally extended use-position;

said sun visor structure further comprising conductor housing means for housing the second portion of the conductor, said conductor housing means being parallel to the pivot rod, wherein the conductor housing means are provided with a longitudinal groove; and said conductor further comprising a third portion which is transversally folded when said conductor runs from the pivot rod to the conductor housing means, connecting said first portion and said second portion, wherein the conductor comprises continuous conductor cables from said first end to said at least one electrical device in the sun visor structure.

Additionally, the sliding sun visor further comprises sliding means fixed to the pivot rod for guiding a sliding movement of the sun visor structure along the pivot rod, the sliding guiding being in turn guided in the sliding movement of the sun visor structure by the conductor housing means The conductor is typically a flexible tape, and said flexible tape can be a flexible flat cable (FFC) or a flexible printed circuit (FPC).

In a preferred embodiment of the invention the conductor housing means has an essentially U-shaped cross section.

In another embodiment of the invention, the sliding sun visor further comprises a first micro-switch for detecting a pivoted sun visor structure use-position. In this embodiment, the pivot rod comprises a flap for activating the first micro-switch.

Optionally, the sliding sun visor further comprises a domotic module such as a "home-link".

In a further embodiment of the invention, the sliding sun visor comprises:

A vanity mirror provided with a cover;

A second micro-switch for detecting the cover position;

Lighting means for lighting the vanity mirror according to the state of the first micro-switch and the state of the second micro-switch.

For the purpose, a flexible printed circuit (FPC) or flexible flat cable (FFC) for power supply is used and also electrical contacts which guarantee vanity mirror lighting switch of lamps placed at headliner or mirror area.

Sun visor with protection by extension beyond the area of its body just guarantee power supply, i.e. vanity mirror lighting, at extreme positions of the extension of sun visor. The present invention includes as a new feature a constant power supply independently of the sun visor extension position, and not only at extreme positions as it is known in the state of the art.

Moreover, while benefiting from constant power supply to vanity mirror command lighting by mirror cover, it is possible to add other electrical fittings such as for example, a domotic, "home-link" or remote control unit to command elements like: garage door opening, exterior light switch-on and the like.

BRIEF DESCRIPTION OF THE DRAWINGS

A series of drawings will be very briefly described below which aid in better understanding the invention, and which are expressly related to several embodiments of said invention, presented as illustrative and non-limiting examples thereof.

FIG. 2 is a perspective view of a sun visor showing the sun visor structure.

FIG. 3A is a detail view of the first end of the pivot rod.

FIG. 3B is a transversal section of the pivot rod.

FIGS. 9A, 9B and 9C, shows different positions adopted by the sun visor, in the first one the sun visor is retired, in the second one the sun visor is intermediate position among the retired position and an extended position.

DESCRIPTION OF PREFERRED EMBODIMENTS OF THE INVENTION

Figure 1A:
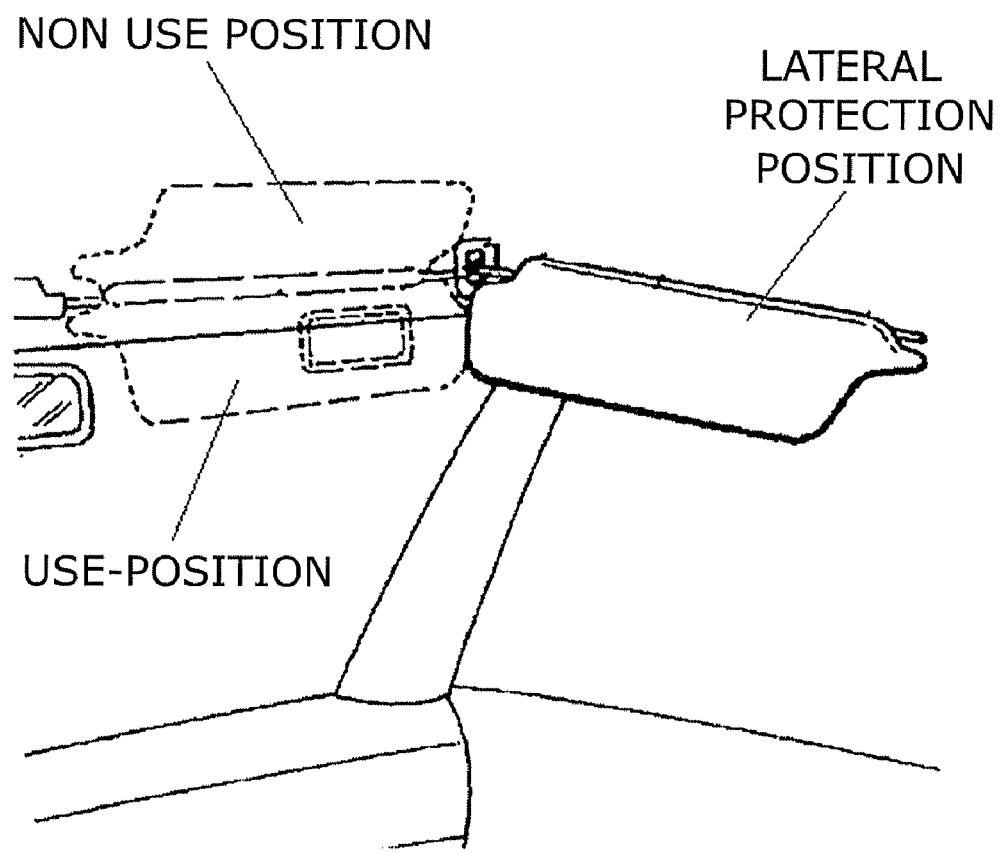
FIG. 1A is a perspective view of the sliding sun visor showing how the sliding sun visor is positioned in a raised storage position or non use-position, a use-position and a lateral protection position.

FIG. 1A shows the three different positions in which the sun visor can be positioned, so it is shown a non use position, a use-position and a lateral protection position.

Figure 1B:
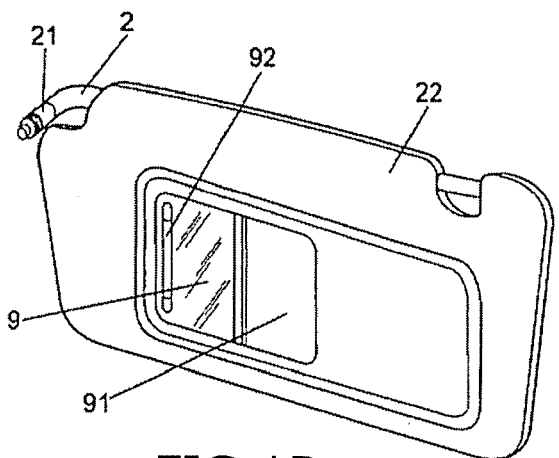
FIGS. 1B, 1C and 1D are perspective views of a sliding sun visor, wherein the different positions that the sun visor can adopt, once in a use-position, are: not-extended, partially extended, and totally extended.
Figure 1C:
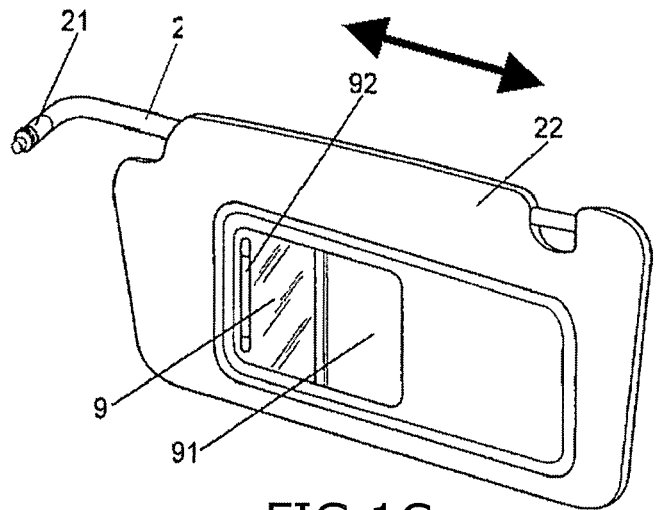
Figure 1D:
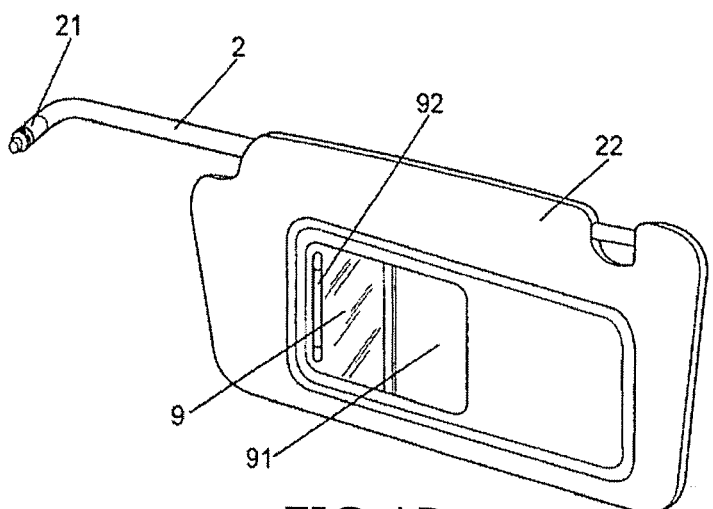

FIGS. 1B, 1C and 1D shows perspective views of a sliding sun visor adopting different positions in a use-position, which are: not-extended, partially extended, and totally extended.

The sun visor includes a mirror with sliding cover as an example not being restrictive, and might also include a mirror without cover or a rotatory cover.

FIG. 2 shows the sun visor interior with the body cover removed. Elements shown are:

Racket 1. Structural plastic element that forms the internal structure of the sun visor.

Pivot rod 2. Plastic element, which allows longitudinally extension of sun visor and rotation from raised storage to lowered use position. Besides, this allows lateral rotation for side protection. The pivot rod is jointly fixed to a slide and a guide channel is formed into the racket sun visor structure 1.

Figure 5:
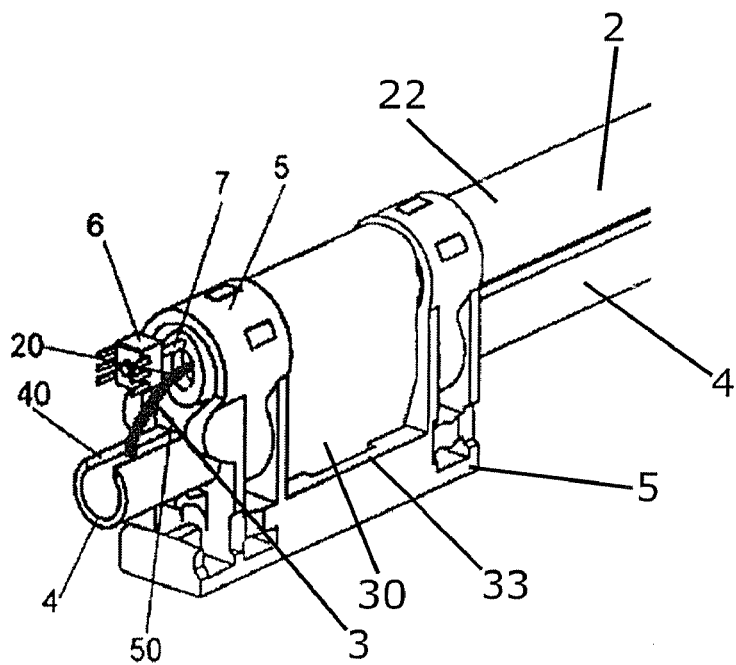
FIG. 5 is a detail view of the sliding guiding means.

Tube 4. Hollow metal element for housing electrical lead or conductor 3 (as shown in FIG. 5, and in more detail as 3', 3", and 3'" in FIGS. 6 and 9a-9c) and for helping slide guidance when extension movement.

Slide 5. Plastic part fixed to the pivot rod 2, which slides along the tube in the racket sun visor structure 1.

Spring 30. Elastic metal element which guarantees constant pressure around the pivot rod to set sun visor use positions.

Arm support 31. The sun visor is hooked to the centre of the headliner and is released therefrom to carry out side protection.

Distributor (not shown). Metal zone, which distributes power supply to electrical fittings.

Mirror Unit. Mirror and plastic support for mirror 9 which includes a sliding cover 91 and electrical elements to allow lighting command with lamps 92 at the headliner or in the mirror unit itself.

FIG. 3A shows a detail of the pivot rod end 21. The pivot rod 2 is a plastic element moulded around a metal tube insert 32 (shown in FIG. 3B). This tube has a hollow space 20 to let the electrical lead or conductor 3 (as shown in FIG. 3B) run in, the electrical lead or conductor 3 being a flexible tape, a kind of flexible flat cable (FFC) or flexible printed circuit (FPC) including tracks and adaptable to curve from a power supply inlet to electrical fittings.

FIG. 3B shows a detail of a transversal section of the pivot rod 2, which depicts the plastic element moulded around a metal tube insert 32 with the electrical lead or conductor 3 inside.

Figure 4:
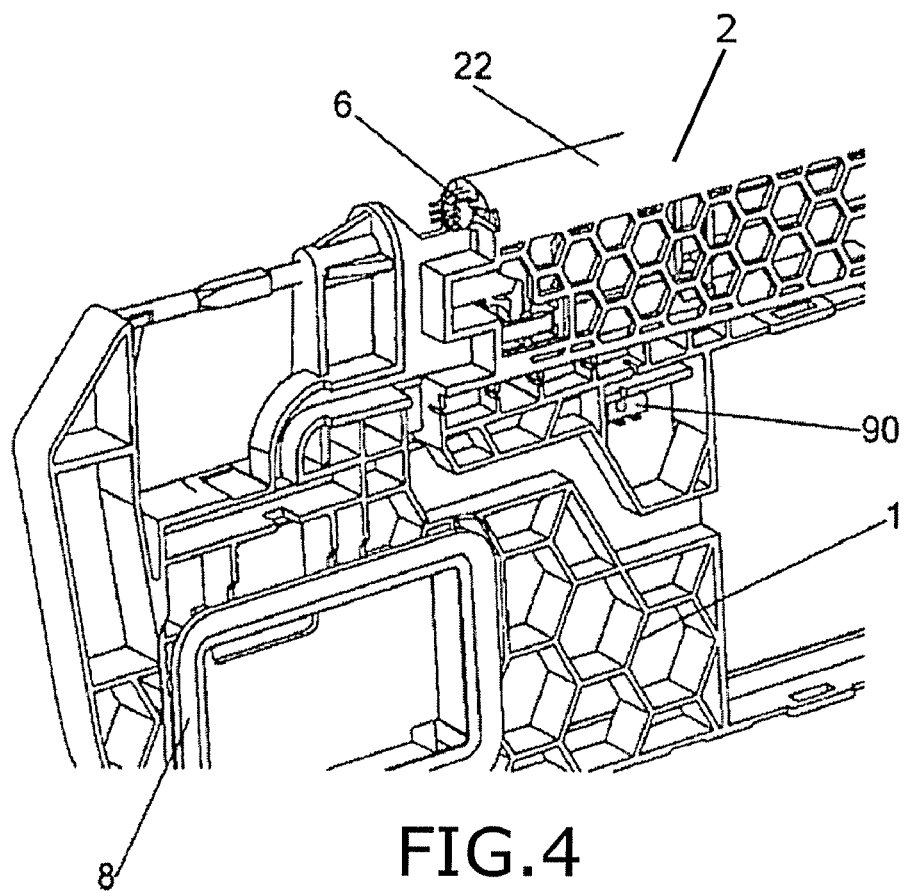
FIG. 4 is a detail view of the second end of the pivot rod.

FIG. 4 shows a detail of the pivot rod 2. Micro-switches 6 are devices that break an electrical circuit and, thus, activate electrical fitting.

The first micro-switch 6 at the top of pivot rod end 22 commands mirror lighting when the sun visor 1 leaves the folded storage position. The second micro-switch 90 at the bottom commands mirror lighting when the mirror cover 91 (not shown) is manipulated. The micro-switches 6, 90 are connected in sequence.

Lighting possibilities are:

| Sun visor position | First micro-switch Pivot rod | Mirror cover Position | Second micro-switch Mirror cover | LIGHT |
|---|---|---|---|---|
| Storage/Folded | Open | Closed | Open | OFF |
| Use | Closed | Closed | Open | OFF |
| Storage/Folded | Open | Open | Closed | OFF |
| Use | Closed | Open | Closed | ON |

FIG. 5 shows slide details with the tube or conductor housing means 4, and the pivot rod 2. The tube or conductor housing means 4 are opened to allow assembly of the conductor 3 that is, the flexible tape (FFC or FPC). At the second pivot rod end 22 the flange or flap 7 is appreciated, which acts as push to the nearest micro-switch 6. In other words, the micro-switch is formed by the micro-switch 6 itself and a flap 7. When the second pivot rod end 22 turns, the said second pivot rod 22 presses flap 7.

Additionally, the sliding guiding means or slide 5 has a protuberance 50 for matching the longitudinal groove 40 of the conductor housing means 4 to prevent relative turning there between.

Figure 6:
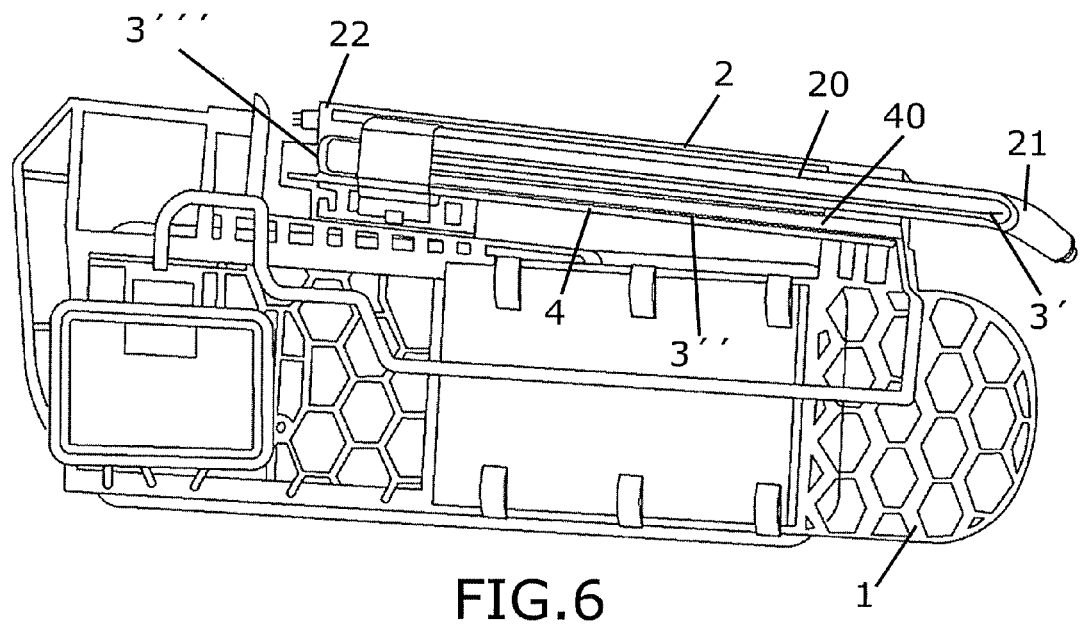
FIG. 6 is a perspective view of the sun visor structure showing the path of the conductor.

FIG. 6 shows a perspective view of the sun visor structure showing the path of the electrical lead or conductor 3 for supplying power to at least one electrical device included in the sun visor structure 1, said conductor 3 having:

a first portion 3' defined between the first end 21 of the pivot rod 2 and the second end 22 of the pivot rod 2, said first portion being housed in the hollow space 20 of the pivot rod 2 and a second portion 3" having at least a length to enable the sun visor structure 1 be positioned in the most extended use-position being housed into the longitudinal groove 40 of the tube 4.

And a third portion 3'" which is transversally folded when in goes from the pivot rod 2 to the tube 4, connecting said first portion 3' and the second portion 3".

Figure 7:
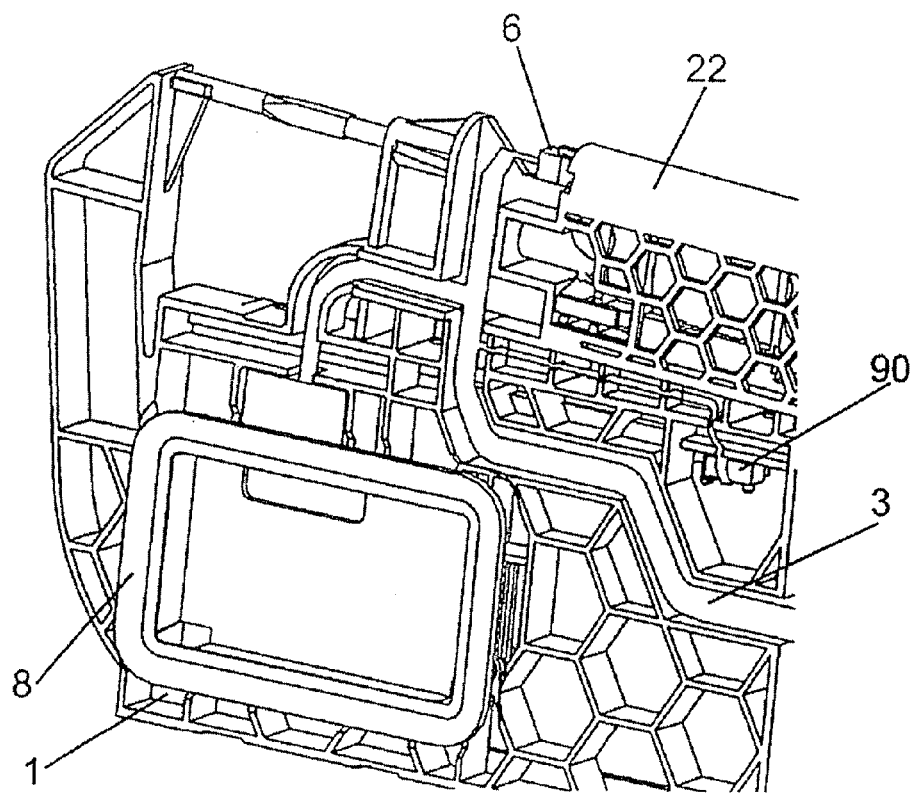
FIG. 7 is a detail view of the sun visor structure.

FIG. 7 shows a remote control unit detail, for instance a domotic "home link" module 8. Power supply is provided by means of a connector.

Figure 8:
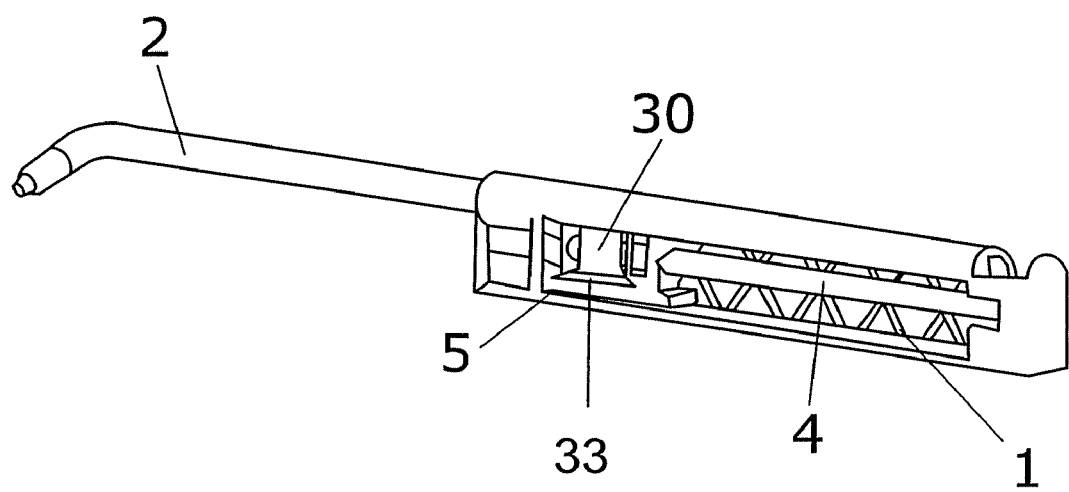
FIG. 8, is a perspective view which shows how the sun visor slides respect of the pivot rod.

FIG. 8 shows a detail of the slide or sliding guiding means 5. The slide or the sliding guiding means 5 are guided in the sliding movement of the sun visor structure 1 by the conductor housing means 4 that are jointed to the pivot rod 2 and to the spring housing 33 (also shown in FIG. 5)

FIGS. 9A, 9B, and 9C. In these figures the sun visor can be observed in three different positions, one in which it is retired, another in which it is completed extended and another intermediate position.

In FIG. 9A which corresponds to an use-position of the sun visor, this is in a non extended position. The conductor 3 coming from the power supply (not shown) comes into the interior of the pivot rod 2 through its first end 21 going throughout it until the second end 22, where it goes out to be introduced into the interior of the tube 4, remaining folding in the end of this tube for going throughout its length until the opposite end of the tube 4 through which goes out to going to the electrical device of the sun visor.

FIG. 9B represents an intermediate position of the sun visor between an extended and a non-extended position. The sun visor in its forward movement, the sun visor moves along the pivot rod 2 in such a way that conductor 3 goes out through the longitudinal groove 40 of the tube 4 with the aim of getting an electrical continuity without needing to increase the conductor length. So at the same time the sun visor moves from a non-extended position to an extended position, the conductor 3 comes out from the tube 4 through the longitudinal groove of the same. So we observe that the conductor 3 it not folded in one of the ends of the tube 4, as it goes out through the longitudinal groove 40 before it reaches said end.

FIG. 9C, shows a sun visor in its most extended position, in this case the length of the tube 4 free of conductor 3 increases.

The invention claimed is:

1. A sliding sun visor having:
  a pivot rod having
    a first end arranged to be articulated to a headliner of a vehicle,
    a second end opposite to the first end, and
    a hollow space extending from the first end to the second end;
  a sun visor structure coupled to the pivot rod in a manner so as to enable the sun visor structure to be placed in a use-position by pivoting around said pivot rod from a raised storage position to a lowered use-position, wherein when the sun visor is in said lowered use-position the sun visor can slide along said pivot rod guaranteeing power supply when the sun visor is not extended, partially extended or totally extended;
  a conductor for supplying power to at least one electrical device included in the sun visor structure, said conductor comprising:
    a first portion defined between the first end of the pivot rod and the second end of the pivot rod, said first portion being housed in the hollow space of the pivot rod and
    a second portion having at least a length to enable the sun visor structure be positioned in the totally extended use-position;
  said sun visor structure further comprising conductor housing means for housing the second portion of the conductor, said conductor housing means being parallel to the pivot rod, wherein the conductor housing means are provided with a longitudinal groove;
  said conductor further comprising a third portion which is transversally folded when said conductor runs from the pivot rod to the conductor housing means, connecting said first portion and said second portion, wherein
  the conductor comprises continuous conductor cables from said first end to said at least one electrical device in the sun visor structure.

2. The sliding sun visor of claim 1 further comprising guiding means fixed to the pivot rod for guiding a sliding movement of the sun visor structure along the pivot rod, the guiding means being in turn guided in the sliding movement of the sun visor structure by the conductor housing means.

3. The sliding sun visor of claim 2, wherein said conductor is a flexible tape.

4. The sliding sun visor of claim 3, wherein said flexible tape is a flexible printed circuit.

5. The sliding sun visor of claim 1, wherein said conductor housing means has an essentially U-shaped cross section.

6. The sliding sun visor of claim 5, wherein said guiding means has a protuberance for matching the longitudinal groove of the conductor housing means to prevent relative turning there between.

7. The sliding sun visor of claim 1, further comprising a first micro-switch for detecting when said sun visor structure is in a pivoted use-position.

8. The sliding sun visor of claim 7, wherein said pivot rod comprises a flap for activating the first micro-switch.

9. The sliding sun visor of claim 1 further comprising a domotic module.

10. The sliding sun visor of any of claim 7 further comprising:
  a vanity mirror provided with a cover;
  a second micro-switch for detecting the position of the cover;
  lighting means for lighting the vanity mirror according to the state of the first micro-switch and the state of the second micro-switch.

* * * * *